(12) United States Patent
Zivich et al.

(10) Patent No.: US 9,751,256 B2
(45) Date of Patent: Sep. 5, 2017

(54) JOINT MOLDING APPARATUS

(71) Applicant: Lockheed Martin Corporation, Bethesda, MD (US)

(72) Inventors: William Peter Zivich, Lancaster, CA (US); Ashley J. Norris, Valencia, CA (US); Matthew Grant Swain, La Crescenta, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 669 days.

(21) Appl. No.: 14/159,009

(22) Filed: Jan. 20, 2014

(65) Prior Publication Data

US 2015/0202823 A1 Jul. 23, 2015

(51) Int. Cl.
| | | |
|---|---|---|
| *B29C 65/78* | (2006.01) | |
| *B29C 65/22* | (2006.01) | |
| *B29C 65/48* | (2006.01) | |
| *B29C 65/50* | (2006.01) | |
| *B29C 65/00* | (2006.01) | |
| *B29L 31/30* | (2006.01) | |

(52) U.S. Cl.
CPC ........ *B29C 65/7841* (2013.01); *B29C 65/224* (2013.01); *B29C 65/4835* (2013.01); *B29C 65/5014* (2013.01); *B29C 65/5057* (2013.01); *B29C 65/5071* (2013.01); *B29C 65/5085* (2013.01); *B29C 65/7802* (2013.01); *B29C 66/112* (2013.01); *B29C 66/114* (2013.01); *B29C 66/12441* (2013.01); *B29C 66/324* (2013.01); *B29C 66/43461* (2013.01); *B29C 66/721* (2013.01); *B29C 66/81455* (2013.01); *B29C 66/81463* (2013.01); *B29C 66/8432* (2013.01); *B29C 66/8122* (2013.01); *B29K 2883/005* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 3,815,863 A | | 6/1974 | Andeweg |
| 5,454,895 A | * | 10/1995 | Imparato ............... B29C 70/342 |
| | | | 156/156 |

(Continued)

FOREIGN PATENT DOCUMENTS

| | | |
|---|---|---|
| EP | 1070661 A2 | 1/2011 |
| WO | 0164387 A1 | 9/2001 |

OTHER PUBLICATIONS

European Search Report for European Pat. App. No. EP15150507 mailed on Nov. 3, 2015.

(Continued)

*Primary Examiner* — Edmund Lee
(74) *Attorney, Agent, or Firm* — Reising Ethington P.C.

(57) ABSTRACT

A joint molding apparatus for molding joints between composite panels comprising inflatable molding bladders connectable to a source of pressurized fluid. A bladder support structure supports the bladders in respective positions adjacent an intersection of panels where, when inflated, the bladders support a joint formed at the intersection of panels while an uncured portion of the joint is curing to hold the joint in a desired configuration at the panel intersection.

12 Claims, 4 Drawing Sheets

(56) References Cited

U.S. PATENT DOCUMENTS

| | | | | |
|---|---|---|---|---|
| 5,538,589 A * | 7/1996 | Jensen | ................... | B29C 69/004 |
| | | | | 100/211 |
| 6,896,841 B2 * | 5/2005 | Velicki | .................... | B29C 65/00 |
| | | | | 264/102 |
| 7,204,951 B2 * | 4/2007 | Simpson | ............... | B29C 70/342 |
| | | | | 264/257 |
| 8,293,051 B2 * | 10/2012 | Morris | .................. | B29C 33/485 |
| | | | | 156/156 |
| 8,800,953 B2 * | 8/2014 | Morris | .................. | B29C 33/485 |
| | | | | 156/156 |
| 9,138,919 B2 * | 9/2015 | Morris | .................. | B29C 33/485 |
| 2005/0006824 A9 | 1/2005 | LeBreton et al. | | |

OTHER PUBLICATIONS

Composites Central website; heating tape for bladder mold? online forum powered by vBulletin Solutions, Inc.; Jun. 21, 2013; 5 pages.

* cited by examiner

JOINT MOLDING APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

Field

This application relates generally to the molding of joints at panel intersections.

Description of Related Art Including Information Disclosed Under 37 CFR 1.97 and 1.98

During aircraft assembly processes, some structural components are known to be joined together using adhesive. Such components must be fixed in place relative to one another while the adhesive cures.

Pi joints are commonly used to brace aircraft structural panels at panel intersections. The Pi joint (named for the shape of its roughly π-shaped cross-section) is coated with adhesive, and fixed to a first panel such that parallel surfaces of the Pi-joint may receive a second panel at an angle to the first. Once the adhesive cures, the Pi-joint becomes a permanent part of the joint formed at the panel intersection.

SUMMARY

A joint molding apparatus is provided for molding joints at panel intersections. The apparatus comprises at least two inflatable molding bladders connectable to a source of pressurized fluid, a bladder support structure configured to support the bladders in respective positions adjacent an intersection of panels where, when inflated, the bladders support a joint formed at the intersection of panels while an uncured portion of the joint is curing to form the uncured composite resin into a desired joint configuration at the panel intersection.

Also, a method is provided for molding joints between composite panels. The method includes the steps of forming at an intersection of panels a joint comprising uncured composite resin, supporting the bladders in respective positions adjacent the intersection of panels, and forming the uncured composite resin into a desired joint configuration at the panel intersection by inflating the bladders until the bladders are supporting the joint while an uncured portion of the joint is curing.

DRAWING DESCRIPTIONS

These and other features and advantages will become apparent to those skilled in the art in connection with the following detailed description and drawings of one or more embodiments of the invention, in which.

DETAILED DESCRIPTION

Figure 1:
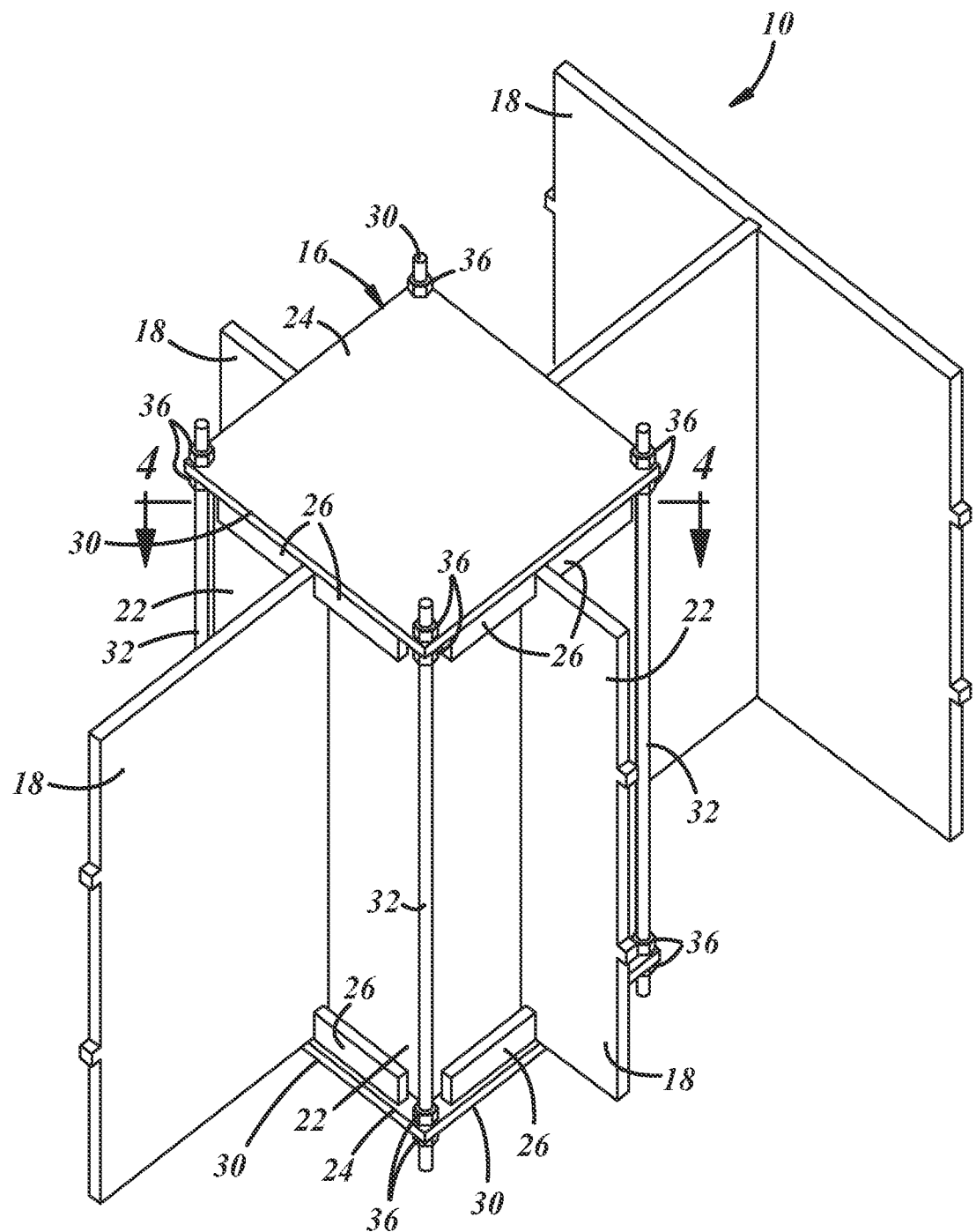
FIG. 1 is a perspective view of a joint molding apparatus supporting panels at a panel intersection.

A joint molding apparatus for molding a joint at an intersection of composite panels is generally shown at 10 in FIGS. 1-4. The apparatus 10 includes inflatable molding bladders 12 connectable to a source of pressurized fluid 14, such as an air compressor. The apparatus 10 may also include a bladder support structure 16 configured to support the bladders 12 in respective positions adjacent an intersection of panels 18 where, when inflated (i.e., filled with sufficient fluid to maintain a desired inflation pressure), the bladders 12 support respective corresponding portions of a joint 20 formed at the intersection 17 of panels 18, while an uncured portion of the joint 20 is curing, to hold the joint 20 in a desired configuration at the panel intersection 17.

Figure 3:
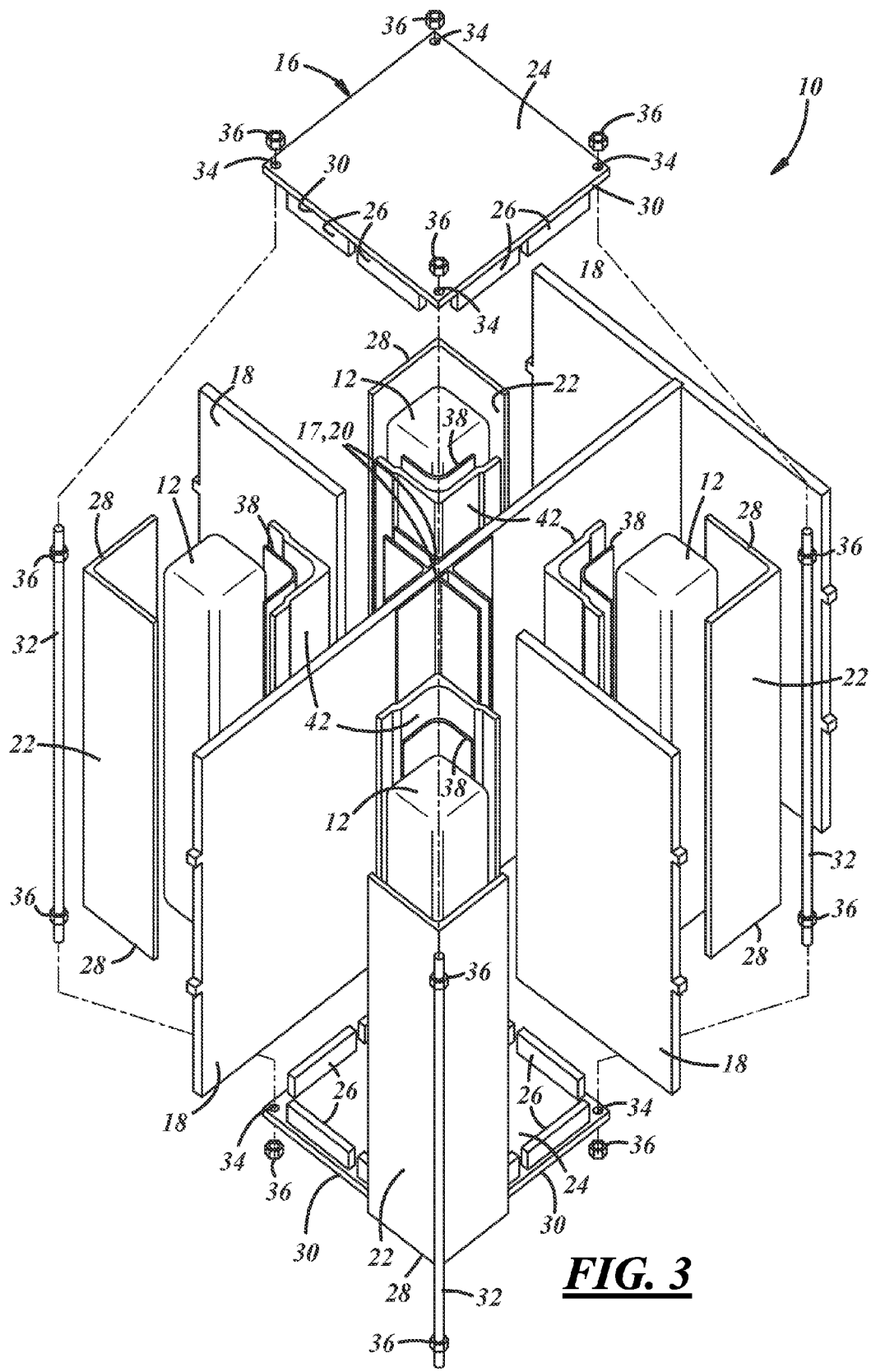
FIG. 3 is an exploded view of the molding apparatus of FIG. 2.
Figure 4:
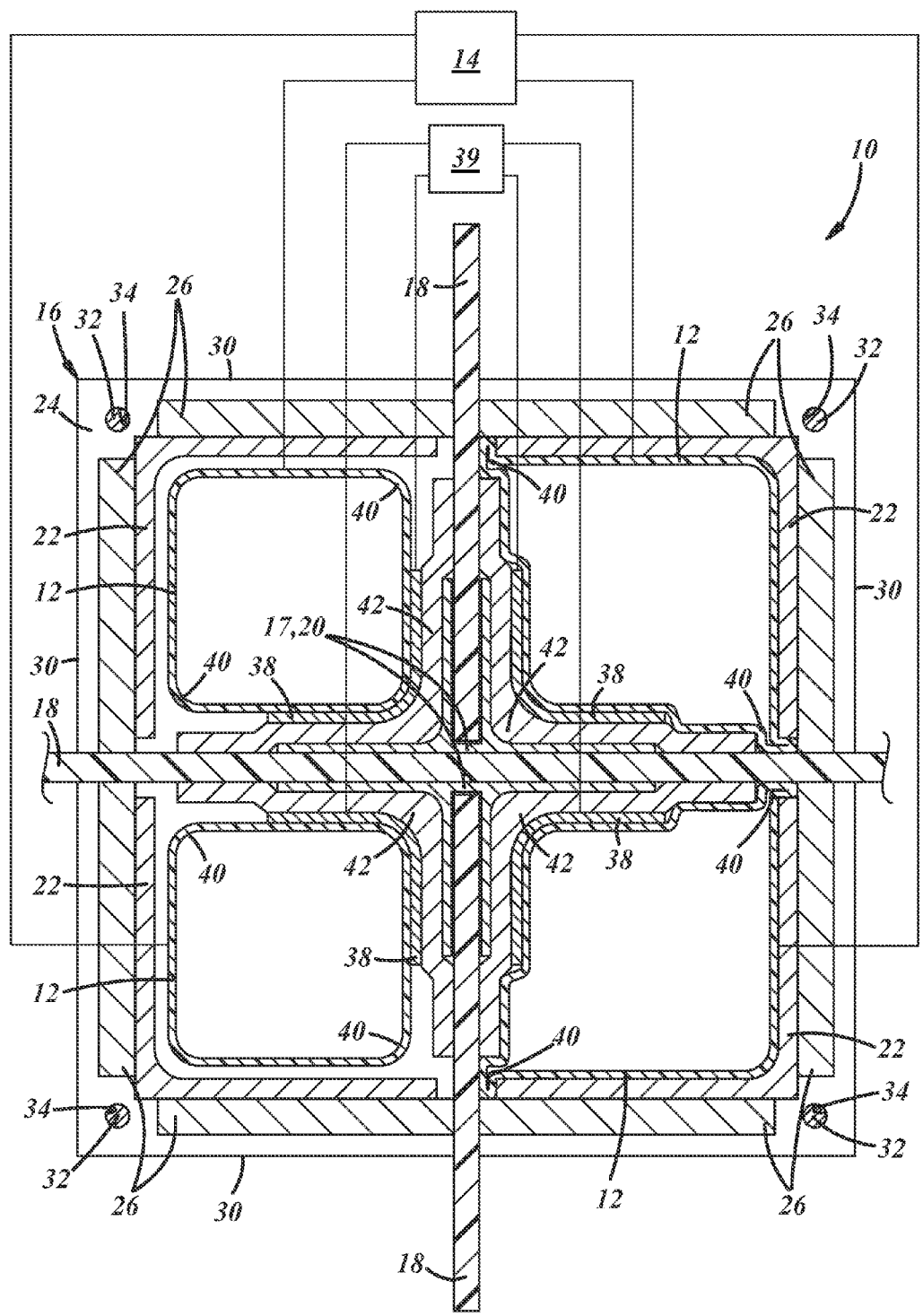
FIG. 4 is a cross-sectional top view of the molding apparatus, panels, and Pi joints of FIG. 1.

As best shown in FIG. 4, the bladder support structure 16 may be configured to support the bladders 12 such that bladder inflation applies pressure to the joint 20 to aid in maintaining desired joint 20 dimensions. In a preferred embodiment, the bladder support structure 16 may include backing members 22 arranged to brace the bladders 12 against outward movement and to direct bladder expansion inwardly against respective corresponding portions of the joint 20 so that bladder inflation pressure is exerted radially inwardly against the joint 20. Where, as shown in FIGS. 1-4, a joint 20 is to be formed at a panel intersection 17 that is a crossing intersection (rather than a "T" intersection) the joint molding apparatus 10 may include 4 bladders 12 and the bladder support structure 16 may include four backing members 22 positioned to support the four bladders 12 in respective panel joint quadrants where, when inflated, the four bladders 12 apply radially inwardly-directed pressure to the joint 20 from each joint quadrant while the uncured portion of the joint 20 is curing.

Figure 2:
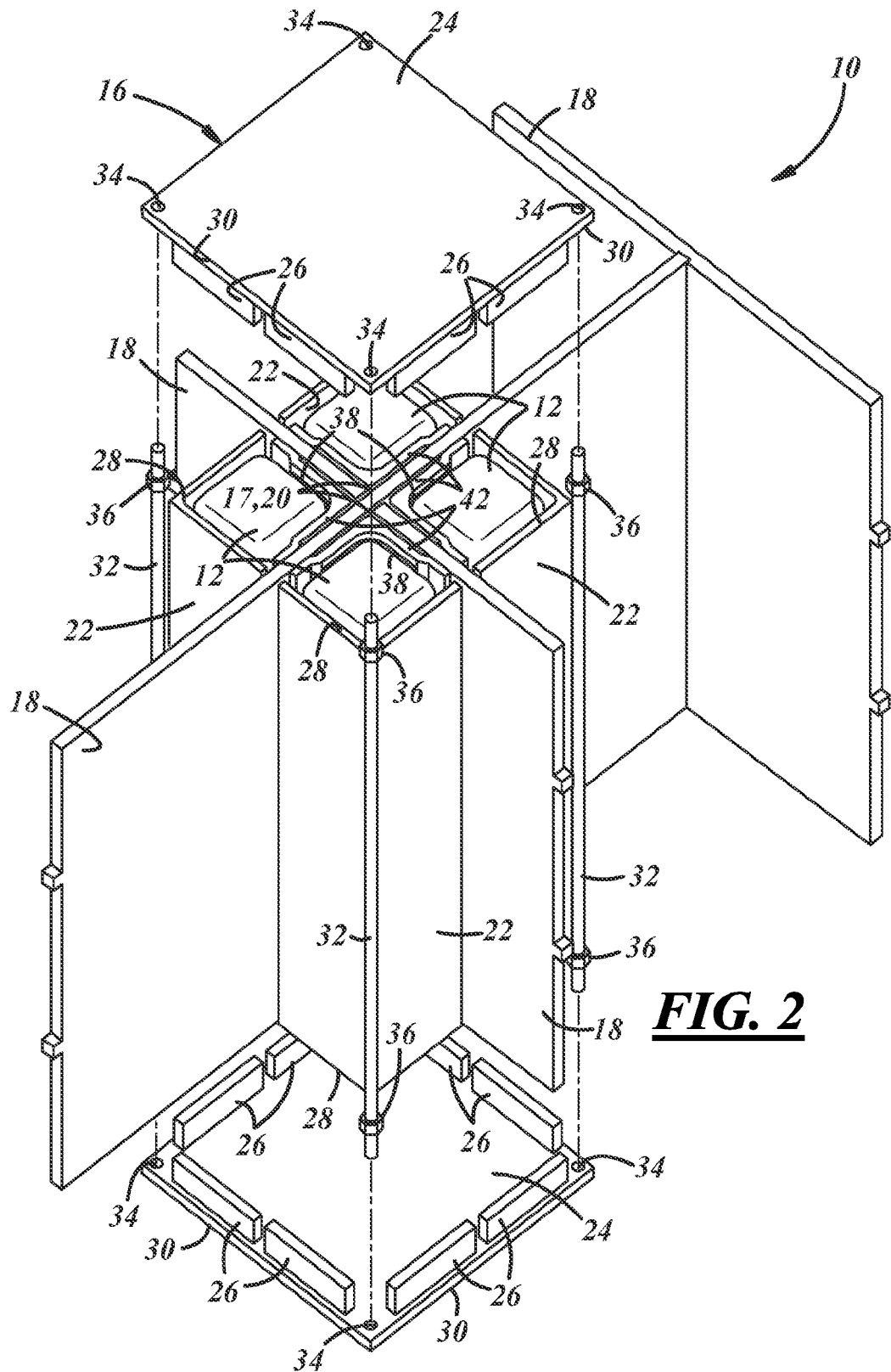
FIG. 2 is a perspective view of the molding apparatus of FIG. 1 with axial end caps shown detached to reveal four internal pressure bladders, four right-angle backing members, and two Pi joints.

In a preferred embodiments, and as best shown in FIGS. 2 and 3, the bladder support structure 16 may include two axial end caps 24 comprising axial projections 26 that engage and retain opposite ends 28 of the backing members 22 against radially outward movement away from the joint 20. The bladder support structure 16 may thus force the bladders 12 to expand radially inward toward the joint 20. The end caps 24 may be generally square in shape and may carry a total of eight rectangular prism-shaped axial projections 26, two of which extend axially from adjacent and along each of four edges 30 of each axial end cap 24.

In the preferred embodiments described above, the joint 20 is a right-angle crossing intersection requiring four right-angle backing members 22, four bladders 12, generally square end caps 24, etc. However, in other embodiments, any intersection configuration (T joints, L joints, Y joints, etc.) of any angle may be similarly supported by employing bladders 12, backing members 22, end caps 24 etc. in any shape and number, such that the bladder support structure's backing members 22 are arranged to brace the bladders 12 against outward movement and to direct bladder expansion inwardly against respective corresponding portions of the joint 20 so that bladder inflation pressure is exerted radially inwardly against the joint 20.

As best shown in FIGS. 2 and 3, the bladder support structure 16 may include holding rods 32 extending axially between, and releasably connecting, the two end caps 24. The holding rods 32 may extend through holes 34 in the end caps 24, and each end of each holding rod 32 may be secured to an end cap 24 by one or more fasteners 36. The holding rods 32 may thus maintain the axial projections 26 in engagement with the ends 28 of the backing members 22 by fixing the axial positions of the end caps 24 relative to one another.

According to a preferred embodiment, and as best shown in FIGS. 3 and 4, one or more of the joints 20 may be or comprise Pi joints, and the bladders 12 may be configured and positioned to, when inflated, support the Pi joints 20 that have been formed at the panel intersection 17 and that comprise uncured composite resin, while the uncured resin in the Pi joints 20 is curing to hold the Pi joints 20 and the joined panels 18 in a desired configuration at the panel intersection 17. In other embodiments, however, the bladders may be configured and positioned to support any other type of joint.

As best shown in FIG. 4 each bladder 12 may include an embedded silicone rubber flexible electrical resistance-type heater 38, as are well known in the art, each of which may be configured to connect to a source of electricity 39 and to provide, when energized, heat sufficient to cure the composite resin of the joints 20.

As shown in FIG. 4, the bladders 12 may include respective expandable sealing regions 40 configured to fill and seal gaps between the backing members 22 and the panels 18, and to prevent uncured resin from escaping from the mold regions through the gaps.

As best shown in FIGS. 3 and 4, a semi-rigid reinforcement 42 may be inserted between each bladder 12 and corresponding portions of the joint 20. Each reinforcement 42 may have a stiffer presentation than the bladder 12, and may be shaped to provide desired joint contours.

In practice, panels 18 may be joined at a panel intersection 17 by forming a joint 20, which may be or comprise a Pi-Joint, comprising uncured composite resin at the intersection 17. The bladders 12 may then be supported in respective positions adjacent the intersection 17 of the panels 18 by disposing bladder backing members 22 in respective positions between the panels 18 and spaced from the joint 20 such that the bladders 12 are disposed between the respective backing members 22 and the joint 20, and installing end caps 24 at opposite ends of the backing members 22 to hold the backing members 22 in place relative to the joint 20. The joint 20 may then be held in a desired configuration by inflating the bladders 12 until the bladders 12 are bearing upon and supporting respective corresponding portions of the joint 20 while an uncured portion of the joint 20 is curing. After the uncured portion of the joint 20 has been allowed to cure sufficiently to hold its shape, the bladders 12 may be deflated and removed along with the backing panels 18 and the end caps 24.

A joint molding apparatus constructed and employed as described above allows joints to be molded and cured between composite panels without need for a curing oven. Among other benefits, this leaves the structure accessible for manual adjustment and monitoring during the curing process without requiring personnel to enter a curing oven.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A joint molding apparatus for molding a joint at a panel intersection, the apparatus comprising:
    four inflatable molding bladders connectable to a source of pressurized fluid; and
    a bladder support structure that supports the bladders in respective positions adjacent an intersection of panels where, when inflated, the bladders support a joint formed at the intersection of panels while an uncured portion of the joint is curing to hold the joint in a desired configuration at the panel intersection, the bladder support structure including:
        backing members arranged to brace the bladders against outward movement and cause the bladders to expand inwardly against respective corresponding portions of the joint; and
        two end caps that engage and retain opposite ends of the backing members against outward movement away from the joint;
    the bladder support structure being configured to support the four bladders in respective panel joint quadrants where, when inflated, the bladders apply radially inwardly-directed pressure to the joint from each joint quadrant while the uncured portion of the joint is curing.

2. A joint molding apparatus as defined in claim 1 in which the bladder support structure is configured to support the bladders such that bladder inflation applies pressure to the joint.

3. A joint molding apparatus as defined in claim 1 in which the bladder support structure includes at least one holding rod extending axially between and releasably connecting the two end caps.

4. A joint molding apparatus as defined in claim 1 in which each bladder includes an embedded silicone rubber flexible heater configured to provide heat sufficient to cure the composite resin.

5. A joint molding apparatus as defined in claim 1 in which the bladders include respective expandable sealing regions configured to fill and seal gaps between the backing members and the panels, and to prevent uncured resin from escaping from the joints through the gaps.

6. A joint molding apparatus as defined in claim 1, further including a semi-rigid reinforcement insertable between each bladder and the joint, each reinforcement having a stiffer presentation than the bladder and shaped to provide desired joint contours.

7. A joint molding apparatus for molding a joint at a panel intersection, the apparatus comprising:
    at least two inflatable molding bladders connectable to a source of pressurized fluid; and
    a bladder support structure that supports the bladders in respective positions adjacent an intersection of panels where, when inflated, the bladders support a joint formed at the intersection of panels while an uncured portion of the joint is curing to hold the joint in a desired configuration at the panel intersection, the bladder support structure including:
        backing members arranged to brace the bladders against outward movement and cause the bladders to expand inwardly against respective corresponding portions of the joint, and
        two end caps that engage and retain opposite ends of the backing members against outward movement away from the joint;
    the bladders being configured to support, when inflated, a Pi joint at the panel intersection while an uncured composite resin portion of the Pi joint is curing to hold the Pi joint in a desired configuration at the panel intersection.

8. A joint molding apparatus as defined in claim 7 in which the bladder support structure is configured to support the bladders such that bladder inflation applies pressure to the joint.

9. A joint molding apparatus as defined in claim 7 in which the bladder support structure includes at least one holding rod extending axially between and releasably connecting the two end caps.

10. A joint molding apparatus as defined in claim 7 in which each bladder includes an embedded silicone rubber flexible heater configured to provide heat sufficient to cure the composite resin.

11. A joint molding apparatus as defined in claim 7 in which the bladders include respective expandable sealing regions configured to fill and seal gaps between the backing members and the panels, and to prevent uncured resin from escaping from the joints through the gaps.

12. A joint molding apparatus as defined in claim 7, further including a semi-rigid reinforcement insertable between each bladder and the joint, each reinforcement having a stiffer presentation than the bladder and shaped to provide desired joint contours.

\* \* \* \* \*